US 12,405,186 B2

United States Patent
Park et al.

(10) Patent No.: US 12,405,186 B2
(45) Date of Patent: Sep. 2, 2025

(54) LENSMETER CAPABLE OF MEASURING NEAR-INFRARED TRANSMITTANCE OF EYEGLASS LENS

(71) Applicant: Hyo Jin Kim, Seongnam-si (KR)

(72) Inventors: Sang Jeon Park, Anyang-si (KR); Kyung Sek Song, Anyang-si (KR); Hyo Jin Kim, Seongnam-si (KR); Tae Hun Kim, Cheonan-si (KR)

(73) Assignee: Hyo Jin Kim, Seongnam-si (KR)

( * ) Notice: Subject to any disclaimer, the term of this patent is extended or adjusted under 35 U.S.C. 154(b) by 272 days.

(21) Appl. No.: 18/299,040

(22) Filed: Apr. 11, 2023

(65) Prior Publication Data
US 2023/0324256 A1     Oct. 12, 2023

(30) Foreign Application Priority Data
Apr. 12, 2022 (KR) .................. 10-2022-0045358

(51) Int. Cl.
*G01B 9/00* (2006.01)
*G01M 11/02* (2006.01)

(52) U.S. Cl.
CPC .... *G01M 11/0235* (2013.01); *G01M 11/0207* (2013.01)

(58) Field of Classification Search
CPC ......... G01M 11/0235; G01M 11/0207; G01M 11/02; G01B 9/00
See application file for complete search history.

(56) References Cited

U.S. PATENT DOCUMENTS 5,175,594 A * 12/1992 Campbell .......... G01M 11/0235
356/127

FOREIGN PATENT DOCUMENTS

| EP | 1560015 A2 * | 8/2005 | ........ G01M 11/0207 |
| JP | 1991-167449 A | 7/1991 | |
| KR | 10-2020-0133570 A | 11/2020 | |
| WO | WO-2005052538 A2 * | 6/2005 | ........... A61B 3/1015 |

OTHER PUBLICATIONS

Office Action for counterpart Korean Patent Application No. 10-2022-0045358, dated May 16, 2024.
Request for the Submission of an Opinion for Korean counterpart Application No. 10-2022-0045358 dated Jan. 7, 2025.
Eye-Love Glasses (Seomyeon Branch), "Introduction of Zeiss VisuLens 550 of Eye-Love Glasses, Seomyeon Branch," Apr. 14, 2020.

* cited by examiner

*Primary Examiner* — David P Porta
*Assistant Examiner* — Fani Polyzos Boosalis
(74) *Attorney, Agent, or Firm* — United One Law Group LLC; Kongsik Kim; Jhongwoo Peck

(57) ABSTRACT

A lensmeter capable of measuring near-infrared ray transmittance of an eyeglass lens by adding a near-infrared ray measurement function to the lensmeter. The lensmeter includes a near-infrared ray transmittance measuring unit that includes a light emitting unit including a near-infrared ray light source for irradiating a measured lens with a near-infrared ray; and a light receiving unit including a near-infrared ray sensor for measuring a near-infrared ray transmittance of the measured lens by detecting an intensity of the near-infrared ray passing through the measured lens, and is located at one end of a housing of the lensmeter.

3 Claims, 3 Drawing Sheets

(a)

(b)

LENSMETER CAPABLE OF MEASURING NEAR-INFRARED TRANSMITTANCE OF EYEGLASS LENS

CROSS-REFERENCE TO RELATED APPLICATION

This application claims priority from Korean Application No. 10-2022-0045358, filed on Apr. 12, 2022, which is incorporated herein by reference in its entirety.

BACKGROUND

1. Technical Field

The present disclosure relates to a lensmeter, and more particularly, to a lensmeter capable of measuring near-infrared transmittance of an eyeglass lens by adding a near-infrared ray measurement function to the lensmeter.

2. Description of the Related Art

In general, sunlight is divided into radio waves such as radio waves and microwaves, infrared rays, visible rays, ultraviolet rays, X-rays, gamma rays, and the like according to wavelengths. Among them, the infrared rays are known to account for about 52% of sunlight, and divided into near-infrared rays (IR-A, wavelength: 760 to 1400 nm), mid-infrared rays (IR-B, wavelength: 1400 to 3000 nm), far infrared rays (IR-C, wavelength: 3000 nm to 1 mm), and the like.

In general, physical treatment is performed by irradiating the skin with infrared rays by a red lamp in a hospital. It is known that effects such as relieving muscle tension and pain, improving blood circulation, promoting metabolism, and increasing joint flexibility may be obtained by infrared irradiation. In the case of infrared irradiation, side effects and precautions are as follows.

- Because it is a treatment using heat, there is a risk of burns if the same area or close thereto is irradiated with infrared rays for a long time. Be especially careful when treating children or companion animals.
- There is a risk of cataract or visual impairment if the eyes are irradiated directly with the infrared rays.
- Pregnant women are advised not to directly irradiate the belly with the infrared rays.
- In the case of a diabetic patient, the patient may not feel the heat because the sensation in the peripheral part is reduced, so be careful of burns.

Although there is controversy, as far as is currently known, when the skin is irradiated with an appropriate amount of near-infrared rays, it is known that the near-infrared rays penetrate into the subcutaneous fat layer of the skin to suppress wrinkles or skin-useful ingredients such as cosmetics penetrate effectively into the skin, thereby having a beneficial effect on the skin. Most electromagnetic waves are harmless to the human body to the extent that they raise the internal temperature of the human body by about 1° C. even when the human body is irradiated therewith.

However, it is known that light in the near-infrared region adversely affects the human eyes. Since the near-infrared rays are accompanied by a strong heating action close to about 100° C., the near-infrared rays are also called heat rays. The Near-infrared rays pass through the skin to heat a localized subcutaneous tissue and raise the skin temperature, thereby causing burns to form erythema on the skin. In particular, when the cornea of the eye is irradiated with the near-infrared rays, it is known to cause pyrogenic cataract and increase the temperature of the eyeball, causing lens opacity, premature presbyopia, disappearance of the reflex ring in the macula, pigmentation, white spot bleeding, and the like.

Recently, facial masks for improving wrinkles and acne that irradiate the face with the infrared rays have been released and are commonly used at home. As these products are used, the need for functional lenses to block harmful light is also increasing. For example, in order to block near-infrared ray that is harmful to the eyeball, near-infrared ray blocking coating is applied to eyeglass lenses (including lenses for sunglasses). Therefore, there is an increasing need to measure a near-infrared ray blocking rate of such eyeglass lenses.

SUMMARY

An object of the present disclosure is to provide a lensmeter capable of measuring near-infrared ray transmittance or blocking rate of eyeglass lens.

Another object of the present disclosure is to provide a lensmeter capable of measuring near-infrared ray transmittance of eyeglass lens, which is capable of further measuring ultraviolet (UV) and/or blue light transmittance or blocking rate as well as near-infrared rays.

In order to achieve these objects, the present disclosure provides a lensmeter including a near-infrared ray transmittance measuring unit (50) that includes a light emitting unit (53) including a near-infrared ray light source (51) for irradiating a measured lens (L) with a near-infrared ray; and a light receiving unit (57) including a near-infrared ray sensor (55) for measuring a near-infrared ray transmittance of the measured lens (L) by detecting an intensity of the near-infrared ray passing through the measured lens (L), and is located at one end of a housing (10) of the lensmeter.

The lensmeter according to the present disclosure measures near-infrared ray transmittance of eyeglass lenses, and may further measure UV and/or blue light transmittance if necessary.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, with reference to the accompanying drawings, the present disclosure will be described in detail.

Figure 1:
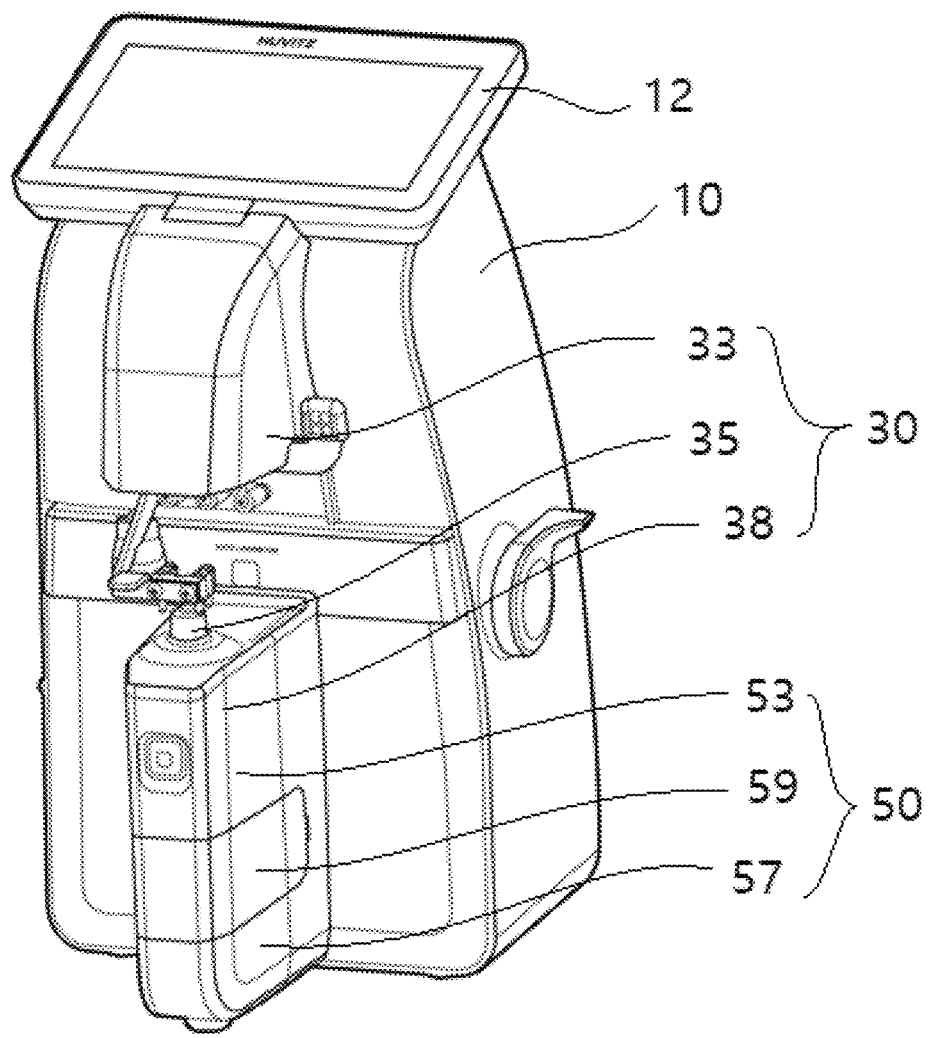
FIG. 1 is a view showing a configuration of a lensmeter capable of measuring near-infrared ray transmittance of an eyeglass lens according to an example of the present disclosure.
Figure 2:
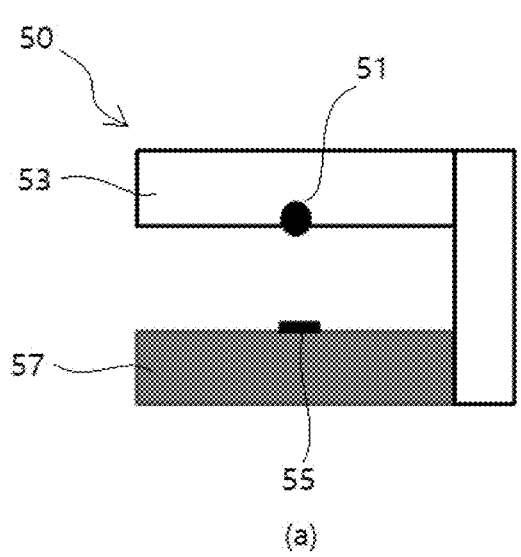
FIG. 2 is a view showing a light emitting unit and a light receiving unit of a near-infrared ray transmittance measuring unit in the lensmeter according to an example of the present disclosure.
Figure 2:
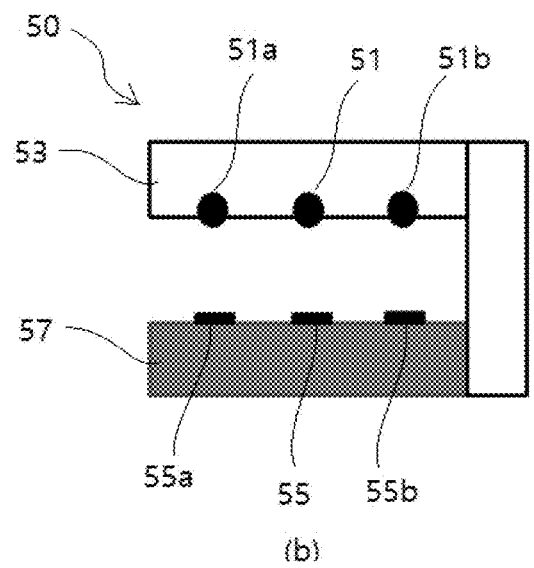
Figure 3:
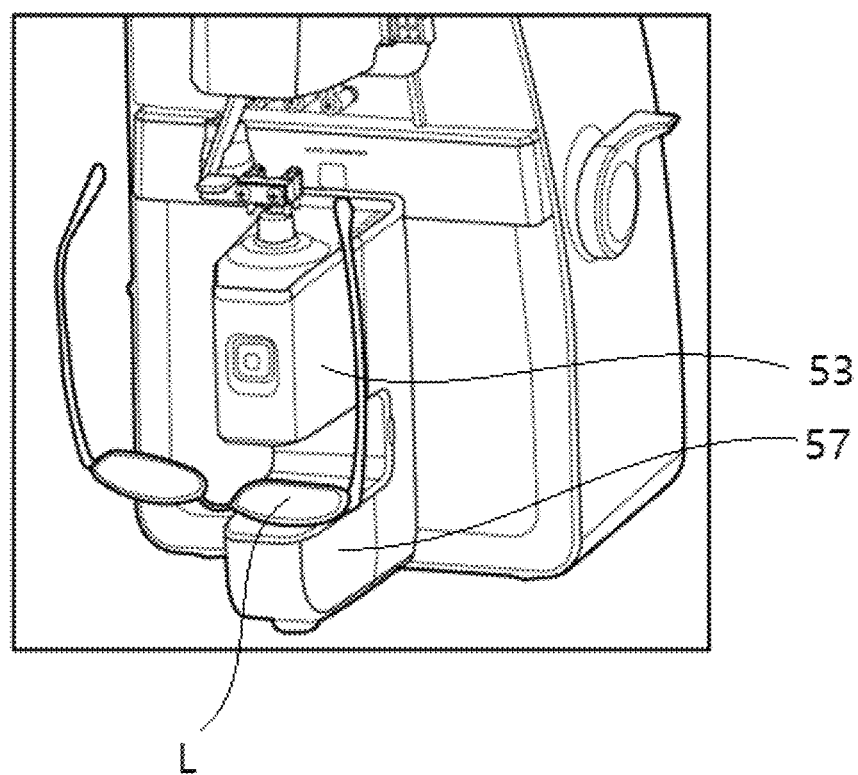
FIG. 3 is a view showing a state in which a near-infrared ray blocking rate of the eyeglass lens is measured by using the lensmeter according to an example of the present disclosure.

FIG. 1 is a view showing a configuration of a lensmeter capable of measuring near-infrared ray transmittance of an eyeglass lens according to an example of the present disclosure, FIG. 2 is a view showing a light emitting unit and a light receiving unit of a near-infrared ray transmittance measuring unit in the lensmeter according to an example of the present disclosure, and FIG. 3 is a view showing a state in which a near-infrared ray blocking rate of the eyeglass lens is measured by using the lensmeter according to an example of the present disclosure. As shown in FIGS. 1 to 3, the lensmeter according to the present disclosure is for measuring the near-infrared ray transmittance of a measured lens (L, see FIG. 3) and includes a near-infrared ray transmittance measuring unit 50.

The near-infrared ray transmittance measuring unit 50 is located at one end, for example, a lower part of a housing 10 of the lensmeter, and as shown in (a) of FIG. 2, includes a light emitting unit 53 including a near-infrared ray light source 51 for irradiating the measured lens L with the near-infrared ray, and a light receiving unit 57 including a near-infrared ray sensor 55 for measuring the near-infrared ray transmittance of the measured lens L by detecting the intensity of the near-infrared ray passing through the measured lens L. The light source located in the light emitting unit 53 is the near-infrared ray light source 51, and a near-infrared ray light emitting diode (LED) emitting the near-infrared rays having a wavelength of 760 nm to 1400 nm may be used as the light source.

As shown in (b) of FIG. 2, the light emitting unit 53 may include a plurality of light sources 51, 51a, and 51b emitting light of various wavelengths. Preferably, as shown in (b) of FIG. 2, the light emitting unit 53 may further include the UV light source 51a and/or the blue light source 51b in addition to the near-infrared ray light source 51. As the UV light source 51a, a UV LED or the like emitting the ultraviolet (UV) ray having a wavelength of 300 to 400 nm may be used, and as the blue light source 51b, a blue light emitting LED or the like emitting blue light having a wavelength of 400 to 500 nm may be used.

The light receiving unit 57 includes sensors 55, 55a, and 55b corresponding to the respective light sources 51, 51a, and 51b, respectively, located in the light emitting unit 53, and specifically, includes the sensors 55, 55a, and 55b that may detect light irradiated from the light sources 51, 51a, and 51b of the light emitting unit 53 and measure the transmittance thereof.

The near-infrared ray sensor 55 is located in the light receiving unit 57, and the near-infrared rays emitted from the near-infrared ray light source 51 pass through the measured lens L and the near-infrared ray sensor 55 detects the intensity of the near-infrared rays passing through the measured lens L, and measures a rate at which the near-infrared rays are transmitted through the measured lens L. Here, the near-infrared ray transmittance is a value obtained by dividing the intensity of the near-infrared rays (transmitted light) passing through the measured lens L by the intensity of the near-infrared rays (incident light) incident to the measured lens L. In this case, the near-infrared ray blocking rate is "1—near-infrared ray transmittance". The light receiving unit 57 may further include the UV sensor 55a for detecting the UV light transmittance emitted from the UV light source 51a and/or the blue light sensor 55b for detecting the blue light transmittance emitted from the blue light source 51b, measure the UV light and/or blue light transmittance, respectively, and selectively measure the light transmittance of a desired wavelength.

If necessary, the near-infrared ray transmittance measuring unit 50 may further include a near-infrared ray cover 59 that blocks a propagation path of the near-infrared ray, UV light, or blue light as needed from the outside. The near-infrared ray cover 59 may prevent the light sources 51, 51a, and 51b, and the sensors 55, 55a, and 55b from being contaminated. In addition, in some cases, the measured lens L is located between the light sources 51, 51a, and 51b, and the sensors 55, 55a, and 55b, and the near-infrared ray cover 59 is mounted, and then the light blocking rate of the measured lens L is measured, so that it is possible to prevent unnecessary light from entering the sensors 55, 55a, and 55b from the outside, thereby improving measurement accuracy.

If necessary, the lensmeter according to the present disclosure may further include a lensmeter unit 30 for measuring optical characteristics such as refractive power of the measured lens L. The lensmeter unit 30 may include a refractive power measuring light source unit 33 for irradiating a measured lens (not shown) located on a lens support 35 with refractive power measurement light, and a refractive power detecting unit 38 that detects the refractive power measurement light whose optical path is changed according to the refractive power of the measured lens while passing through the measured lens located on the lens support 35 and calculates the optical characteristics of the measured lens from a light quantity distribution and an image formation position of the detected refractive power measurement light.

Preferably, the refractive power detecting unit 38 is located below the lens support 35 so as to support the lens support 35. In addition, as shown in FIGS. 1 and 3, the refractive power detecting unit 38 is integrally formed with the near-infrared ray transmittance measuring unit 50, and the refractive power detecting unit 38 and the near-infrared ray transmittance measuring unit 50 are preferable to have externally a single pillar shape. In this case, the refractive power measuring light source unit 33, the lens support 35, the refractive power detecting unit 38, the near-infrared ray light source 51, and the near-infrared ray sensor 55 are sequentially disposed in a substantially vertical direction.

As shown in FIG. 1, the lens support 35 may have a substantially cylindrical shape, the measured lens (left eye lens or right eye lens) may be located on the lens support 35, and the refractive power measuring light source unit 33 and the refractive power detecting unit 38 may be used to measure the optical characteristics such as SPH (spherical refractive power, nearsightedness), CYL (cylindrical refractive power, amount of astigmatism), and AX (astigmatism axis) of the measured lens.

In addition, if necessary, the optical characteristics of the lens together with the near-infrared ray transmittance of the lens may be output through the display unit 12 or the like. Therefore, the lensmeter according to the present disclosure may include the conventional display unit 12 for outputting the measurement process or measurement result of the near-infrared ray transmittance measuring unit 50 on a screen and, for example, as shown in FIG. 1, the display unit 12 may be mounted on an upper part of the housing 10 of the lensmeter body.

In order to measure the near-infrared ray transmittance of the measured lens L by using the lensmeter according to the present disclosure, as shown in FIG. 3, first, the near-infrared ray cover 59 is removed or opened from the near-infrared ray transmittance measuring unit 50, the measured lens L is located between the light emitting unit 53 and the light receiving unit 57, the near-infrared rays generated from the near-infrared ray light source 51 included in the light emitting unit 53 are incident on the measured lens L, and the intensity of the near-infrared rays passing through the measured lens L is detected by the near-infrared ray sensor 55 included in the light receiving unit 57, so that the near-infrared ray transmittance of the measured lens L may be measured.

In order to measure the near-infrared ray transmittance by using the lensmeter according to the present disclosure, first, a degree of the near-infrared ray transmittance of at least one lens having a known near-infrared ray transmittance (that is, the intensity of the near-infrared ray detected by the near-infrared ray sensor 55) is detected. The detected result value is stored as a default value (namely, a reference value) in a detecting unit (not shown in the drawing) in advance. Thereafter, the measured lens is located between the light emitting unit 53 and the light receiving unit 57 according to the present disclosure, and the degree of the near-infrared ray transmittance is measured. From the degree of the near-infrared transmittance of the measured lens, the near-infrared ray transmittance of the measured lens may be known according to the pre-stored default value. For example, lenses that block 0% (namely, the transmittance is 100%), 10% (namely, the transmittance is 90%), 30% (namely, the transmittance is 70%), 50% (namely, the transmittance is 50%), 70% (namely, the transmittance is 30%), 90% (namely, the transmittance is 10%), and 100% (namely, the transmittance is 0%) of the near-infrared rays are used to detect each degree of the near-infrared ray transmittance, and each degree thereof is set as the default value of the near-infrared ray transmittance.

If the degree of the near-infrared ray transmittance of the measured lens L is measured by using the lensmeter according to the present disclosure, the corresponding near-infrared ray transmittance may be calculated according to the default value pre-stored in the detecting unit. The measurement result (near-infrared ray transmittance) of the measured lens is output through the screen of the display unit 12.

If the near-infrared ray transmittance is 100%, it means that all near-infrared rays pass through the lens, and if the transmittance is 0%, it means that near-infrared rays do not pass the lens at all.

In addition to the near-infrared ray transmittance, the UV and/or blue light transmittance may be measured in the same way.

Therefore, the lensmeter according to the present disclosure may measure the near-infrared ray blocking rate of the eyeglass lens, and may further selectively measure the UV and/or blue light transmittance as well as the near-infrared ray of the eyeglass lens.

Although the present disclosure has been described with reference to the accompanying drawings and exemplary examples, the present disclosure is not limited to the contents shown in the drawings and the above-described examples. Although reference numerals are indicated to aid understanding in the claims, the scope of the following claims is not limited to the content shown in the reference numerals and drawings, and should be construed to cover all modifications, equivalent configurations and functions of the exemplary examples.

What is claimed is:

1. A lensmeter comprising:
   a near-infrared ray transmittance measuring unit disposed at one end of a housing of the lensmeter, wherein the near-infrared ray transmittance measuring unit comprises:
      a light emitter including a near-infrared ray light source for irradiating a measured lens with a near-infrared ray; and
      a light receiver including a near-infrared ray sensor for measuring a near-infrared ray transmittance of the measured lens by detecting an intensity of the near-infrared ray passing through the measured lens; and
   a lensmeter unit, which comprises:
      a refractive power measuring light source for irradiating the measured lens disposed on a lens support with refractive power measurement light; and
      a refractive power detector that detects the refractive power measurement light whose optical path is changed based on a refractive power of the measured lens while passing through the measured lens disposed on the lens support and calculates optical characteristics of the measured lens from a light quantity distribution and an image formation position of the detected refractive power measurement light,
   wherein the near-infrared ray light source is a near-infrared ray LED that emits near-infrared rays having a wavelength of 760 nm to 1400 nm,
   wherein the refractive power detector is disposed below the lens support to support the lens support, the refractive power detector is integrally formed with the near-infrared ray transmittance measuring unit, and the refractive power detector and the near-infrared ray transmittance measuring unit have externally a single pillar shape, and
   wherein the refractive power measuring light source, the lens support, the refractive power detector, the near-infrared ray light source, and the near-infrared ray sensor are sequentially disposed in a vertical direction.

2. The lensmeter according to claim 1, wherein the near-infrared ray transmittance measuring unit further includes a near-infrared ray cover that blocks a propagation path of the near-infrared ray from the outside.

3. The lensmeter according to claim 1, wherein the light emitter further includes a UV light source or a blue light source, and the light receiver further includes a UV sensor for detecting an UV light transmittance emitted from the UV light source or a blue light sensor for detecting a blue light transmittance emitted from the blue light source.

* * * * *